(12) United States Patent
Neystadt et al.

(10) Patent No.: US 8,677,479 B2
(45) Date of Patent: Mar. 18, 2014

(54) DETECTION OF ADVERSARIES THROUGH COLLECTION AND CORRELATION OF ASSESSMENTS

(75) Inventors: John Neystadt, Kfar Saba (IL); Efim Hudis, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1419 days.

(21) Appl. No.: 11/893,934

(22) Filed: Aug. 17, 2007

(65) Prior Publication Data

US 2008/0256619 A1    Oct. 16, 2008

Related U.S. Application Data

(60) Provisional application No. 60/923,663, filed on Apr. 16, 2007.

(51) Int. Cl.
  *H04L 29/06*     (2006.01)
(52) U.S. Cl.
  USPC ............................................. 726/22; 726/25
(58) Field of Classification Search
  USPC ..................................................... 726/22–25
  See application file for complete search history.

(56) References Cited

U.S. PATENT DOCUMENTS

| | | | |
|---|---|---|---|
| 5,097,469 A | 3/1992 | Douglas | |
| 5,497,460 A | 3/1996 | Bailey et al. | |
| 5,892,903 A | 4/1999 | Klaus | |
| 5,982,753 A | 11/1999 | Pendleton et al. | |
| 6,088,804 A | 7/2000 | Hill et al. | |
| 6,415,313 B1 | 7/2002 | Yamada et al. | |
| 6,415,329 B1 | 7/2002 | Gelman et al. | |
| 6,711,137 B1 | 3/2004 | Klassen et al. | |
| 6,772,214 B1 | 8/2004 | McClain et al. | |
| 6,807,156 B1 | 10/2004 | Veres | |
| 6,859,829 B1 | 2/2005 | Parupudi et al. | |
| 6,934,290 B2 | 8/2005 | Story | |
| 6,938,080 B1 | 8/2005 | Kahveci et al. | |
| 6,941,384 B1 | 9/2005 | Aiken et al. | |
| 6,993,584 B2 | 1/2006 | Border | |

(Continued)

FOREIGN PATENT DOCUMENTS

| | | |
|---|---|---|
| WO | 02/093334 A2 | 11/2002 |
| WO | 2006/074294 A2 | 7/2006 |

OTHER PUBLICATIONS

International Search Report from corresponding PCT Application No. PCT/US2008/057742 dated Jul. 23, 2008, 3 pages.

(Continued)

*Primary Examiner* — Edward Zee
(74) *Attorney, Agent, or Firm* — Ben Tabor; Kate Drakos; Micky Minhas

(57) ABSTRACT

An automated arrangement for detecting adversaries is provided in which assessments of detected adversaries are reported to a reputation service from security devices, such as unified threat management systems in deployed customer networks. By using actual deployed networks, the number of available sensors can be very large to increase the scope of the adversary detection, while still observing real attacks and threats including those that are targeted to small sets of customers. The reputation service performs a number of correlations and validations on the received assessments to then return a reputation back to the security device in the enterprise network that can be used for blocking adversaries, but only when multiple, distinct sources report the same adversary in their assessments to thus ensure that the reputation is accurate and reliable.

19 Claims, 4 Drawing Sheets

(56) References Cited

U.S. PATENT DOCUMENTS

| | | | |
|---|---|---|---|
| 6,996,631 | B1 | 2/2006 | Aiken et al. |
| 7,007,089 | B2 | 2/2006 | Freedman |
| 7,007,302 | B1* | 2/2006 | Jagger et al. .................. 726/25 |
| 7,080,141 | B1 | 7/2006 | Beekelmans et al. |
| 7,082,467 | B2 | 7/2006 | Border |
| 7,085,925 | B2 | 8/2006 | Hanna et al. |
| 7,152,105 | B2 | 12/2006 | McClure et al. |
| 7,174,454 | B2 | 2/2007 | Roskind |
| 7,203,753 | B2 | 4/2007 | Yeager et al. |
| 7,430,611 | B2 | 9/2008 | Aiken et al. |
| 7,596,097 | B1* | 9/2009 | McCowan et al. ............ 370/248 |
| 7,774,361 | B1* | 8/2010 | Nachenberg et al. ......... 707/779 |
| 7,817,668 | B2 | 10/2010 | Igarashi et al. |
| 2002/0147837 | A1 | 10/2002 | Heller |
| 2002/0150041 | A1 | 10/2002 | Reinshmidt et al. |
| 2003/0014665 | A1* | 1/2003 | Anderson et al. ............. 713/201 |
| 2003/0018585 | A1 | 1/2003 | Butler et al. |
| 2003/0018930 | A1 | 1/2003 | Mora et al. |
| 2003/0023876 | A1 | 1/2003 | Bardsley et al. |
| 2003/0028614 | A1 | 2/2003 | Jeon |
| 2003/0043802 | A1 | 3/2003 | Yazaki et al. |
| 2003/0126227 | A1 | 7/2003 | Zimmerman et al. |
| 2003/0159069 | A1 | 8/2003 | Choi et al. |
| 2003/0163729 | A1* | 8/2003 | Buchegger .................. 713/201 |
| 2003/0177213 | A1 | 9/2003 | Wallace |
| 2003/0217173 | A1 | 11/2003 | Butt et al. |
| 2004/0044912 | A1 | 3/2004 | Connary et al. |
| 2004/0083408 | A1* | 4/2004 | Spiegel et al. .................. 714/43 |
| 2004/0109477 | A1 | 6/2004 | Lee et al. |
| 2004/0122926 | A1 | 6/2004 | Moore et al. |
| 2004/0187032 | A1 | 9/2004 | Gels et al. |
| 2004/0250114 | A1* | 12/2004 | Parekh et al. .................. 713/201 |
| 2005/0052998 | A1 | 3/2005 | Oliver et al. |
| 2005/0091355 | A1 | 4/2005 | Keohane et al. |
| 2005/0259633 | A1 | 11/2005 | Kato |
| 2005/0283527 | A1 | 12/2005 | Corrado et al. |
| 2006/0004918 | A1 | 1/2006 | Lubeck et al. |
| 2006/0042483 | A1 | 3/2006 | Work et al. |
| 2006/0095970 | A1 | 5/2006 | Rajagopal et al. |
| 2006/0129803 | A1 | 6/2006 | Anand et al. |
| 2006/0153200 | A1 | 7/2006 | Filsfils et al. |
| 2006/0182036 | A1 | 8/2006 | Sasagawa et al. |
| 2006/0200487 | A1 | 9/2006 | Adelman et al. |
| 2006/0212931 | A1 | 9/2006 | Shull et al. |
| 2006/0224709 | A1 | 10/2006 | Johnson et al. |
| 2006/0242268 | A1 | 10/2006 | Omernick et al. |
| 2006/0253458 | A1 | 11/2006 | Dixon et al. |
| 2006/0253578 | A1 | 11/2006 | Dixon et al. |
| 2006/0253580 | A1 | 11/2006 | Dixon et al. |
| 2006/0253581 | A1 | 11/2006 | Dixon et al. |
| 2006/0253582 | A1 | 11/2006 | Dixon et al. |
| 2006/0253583 | A1 | 11/2006 | Dixon et al. |
| 2006/0253584 | A1 | 11/2006 | Dixon et al. |
| 2006/0265760 | A1 | 11/2006 | Daemke et al. |
| 2006/0272018 | A1 | 11/2006 | Fouant |
| 2006/0294579 | A1 | 12/2006 | Khuti et al. |
| 2007/0005787 | A1 | 1/2007 | Igarashi et al. |
| 2007/0064626 | A1 | 3/2007 | Evans |
| 2007/0078699 | A1 | 4/2007 | Scott et al. |
| 2007/0094725 | A1* | 4/2007 | Borders ......................... 726/22 |
| 2007/0127393 | A1 | 6/2007 | Car |
| 2007/0169194 | A1* | 7/2007 | Church et al. .................. 726/23 |
| 2008/0025218 | A1 | 1/2008 | Liu |

OTHER PUBLICATIONS

Allen, et al., "State of the Practice of Intrusion Detection Technologies", Date: Jan. 2000, pp. 1-242.

Larson., "Aspects of Adapting Data Collection to Intrusion Detection". pp. 1-128, 2006.

Agarwal et al., "An Infrastructure for Passive Network Monitoring of Applicaiton Data Streams", http://congo.postech.ac.kr/PAPER/MONITORING/PAM/2003/agarval.pdf, Year 2003.

Balakrishnan et al., "TCP Behavior of a Busy Internet Server: Analysis and Improvements", http://nms.ics.mit.edu/hari/papers/infocom98.ps.gz, Year 1998.

Padmanabhan et al., "Network Tomography Using Passive End-to-End Measurements", http://research.microsoft.com/padmanab/papers/dimacs2002.pdf, Year 2002.

Paxson Vern, "End-to-End Internet Packet Dynamics", Date: Jun. 1999, vol. 7, http://delivery.acm.org/10.1145/320000/312234/00779192.pdf?key1=312234&key2=0458187611&coll-GUIDE$dl=GUIDE&CEID=10427251$cetoken=17506759.

Bace et al., "NIST Special Publication on Intrusion Detection Systems" 2007, downloaded at http://www.21cfrpart11.com/files/library/reg_guid_docs/nist_intrusiondetectionsys.pdf pp. 1-51.

Alunkal, Beulah Kurian, "Grid Eigen Trust a Framework for Computing Reputation in Grids", Date: Dec. 2003, Chicago, Illinois (93 pages).

Baker, et al., "Local Control over Filtered WWW access", http://cm.bell-labs.com/who/bsb/papers/signet/Overview.html, Date: May 7, 2007 (10 pages).

Kostoulas, Dionysios Konstantinos, "Distibuted reputation-based mechansims for trust propagation in large groups", Date: 2002, Urbana, Illinois (93 pages).

Lik Mui et al., "A computational Trust Model of Confidence and Reputation", Proceedings of the 35th Annual Hawaii International Conference on System Sciences, pp. 2431-2439, Jan. 2002 (10 pages total).

Extended European Search Report issued Nov. 15, 2013 in connection with corresponding EP Patent Application No. 08732611.2 (10 pages total).

Josang, et al., "Simulating the Effect of Reputation Systems on e-Markets", Trust Management, First International Conference, ITRUST 2003, proceedings May 28-30, 2003, Heraklion, Crete, Greece May 30, 2003 (16 pages total).

* cited by examiner

DETECTION OF ADVERSARIES THROUGH COLLECTION AND CORRELATION OF ASSESSMENTS

STATEMENT OF RELATED APPLICATION

This application claims the benefit of U.S. Provisional Patent Application Ser. No. 60/923,663, filed Apr. 16, 2007, entitled "Detection of Adversaries through Collection and Correlation of Assessments," which is incorporated herein by reference in its entirety.

BACKGROUND

The term computer "hacker" is increasingly used to refer to persons who engage in malicious or illegal activities to gain access to, or attack computer systems without authorization. Such activities by hackers have evolved far beyond those that were simply pranks or caused some minor inconveniences into a key component of highly organized criminal enterprises in which billions of dollars can be made each year.

Hackers often seek to launch attacks on computer systems in an automated manner by using large networks called "botnets" of compromised computers called "bots" (i.e., software robots) or "drones." While bots can be supported by hosts that bypass most local Internet content regulation (so called "bullet-proof hosts"), bots are primarily found in computers used by innocent home users who are completely unaware that their systems have been taken over and are being used for illegitimate purposes. Botnets are thought to be organized in herds as large as one hundred thousand to a half million or more bots that can be geographically spread over many countries.

Botnets can employ both active and passive attacks. In an active attack, a botnet originates attacking traffic such as spam, adware, or denial of service ("DoS") traffic which is sent over a network such as the Internet to its victims. In a passive attack, bots function as servers which, when accessed by a user, serve malware such as viruses, rootkits, trojan horses etc., typically using HTTP (Hypertext Transfer Protocol).

Reputation services have been established to address the problem of automated attacks and other hacker activities by compiling black lists of URLs (Uniform Resource Locators) and IP (Internet Protocol) addresses of known adversaries. A variety of technologies such as mail relay servers, firewalls, and unified threat management gateways can query the reputation service through an online connection to decide whether to accept traffic from, or send traffic to, a given computer on the Internet.

Current reputation services often run their own laboratories that are equipped with a variety of tools which are used to scan the Internet to locate adversaries and establish the reputation. These tools include web crawlers, honeypots (passive, dummy data or network sites that appear to contain information of value to attract attackers), honey monkeys (virtual computers that visit websites and seek code designed to attack a computer), virtual machines, and other global sensors.

Reputation services face several significant challenges that can affect their use and success in combating hackers. For example, reputation services must reliably detect and confirm adversaries that are deployed in vast numbers all over the world. Hackers can also change URLs and IP addresses of bots frequently, so reputation services must be able to dynamically respond with equal speed to detect them and not block legitimate users who might reuse the same URL or IP address a few hours later. This problem of false positives in which URLs and IP addresses of innocent (i.e., non-malicious) computers are wrongly identified as adversaries can cause significant disruptions to users and result in high costs to service providers to resolve disputes and restore services.

In addition, reputation services need to successfully deal with hackers who are increasingly targeting attacks on small sets of customer or enterprise networks that frequently go unobserved by the technologies of existing reputation services.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An automated arrangement for detecting adversaries is provided in which assessments of detected adversaries are reported to a reputation service from security devices, such as unified threat management ("UTM") systems, in deployed enterprise networks. By using actual deployed networks, the number of available sensors can be very large to increase the scope of the adversary detection, while still observing real attacks and threats including those that are targeted to small sets of customers. The reputation service performs a number of correlations and validations on the received assessments to then return a reputation back to the security device that can be used for blocking adversaries.

In various illustrative examples, the assessment includes a URL or IP address of the adversary plus a severity level (e.g., low, medium, high, critical) of the incident associated with the attack or malware. The reputation service verifies that the assessment comes from a authenticated known sources, to make it expensive for a hacker to misuse assessments to damage the service through DoS attacks or the filing of false reports. Authentication may be performed using a certificate to sign assessments or other cryptographic methods.

Each reported assessment is assigned a time-to-live ("TTL") value that sets the length of the time the assessment is valid to deal with an adversary changing IP addresses and URLs of bots under its control. If, after a TTL expires, the same adversary is detected again, another assessment is sent where the TTL is increased, for example, using an algorithm that increases the TTL value with each recurring detection (e.g., from an initial TTL value of 4 hours to 8 hours, then 16 hours, and so forth upon each detection recurrence).

The reputation service establishes fidelity (i.e., confidence level) of a reputation according to the number of enterprises or customers reporting the same adversary. Only when multiple, distinct enterprises report the same adversary in valid assessments (i.e., those with an unexpired TTL) will the reputation have sufficient fidelity to be sent back to the reporting enterprises to be used to actually block adversaries.

Certain types of hosts such as large proxies and share web hosting sites are included in a list of known exclusions and are not subjected to blocking. In addition, privacy concerns may be addressed by hashing the adversary's URL or IP address in the assessments reported by the security devices in the network to thereby mask the identity of particular adversaries that affect particular enterprises or customers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Similar reference numerals indicate similar elements in the drawings.

DETAILED DESCRIPTION

Figure 1:
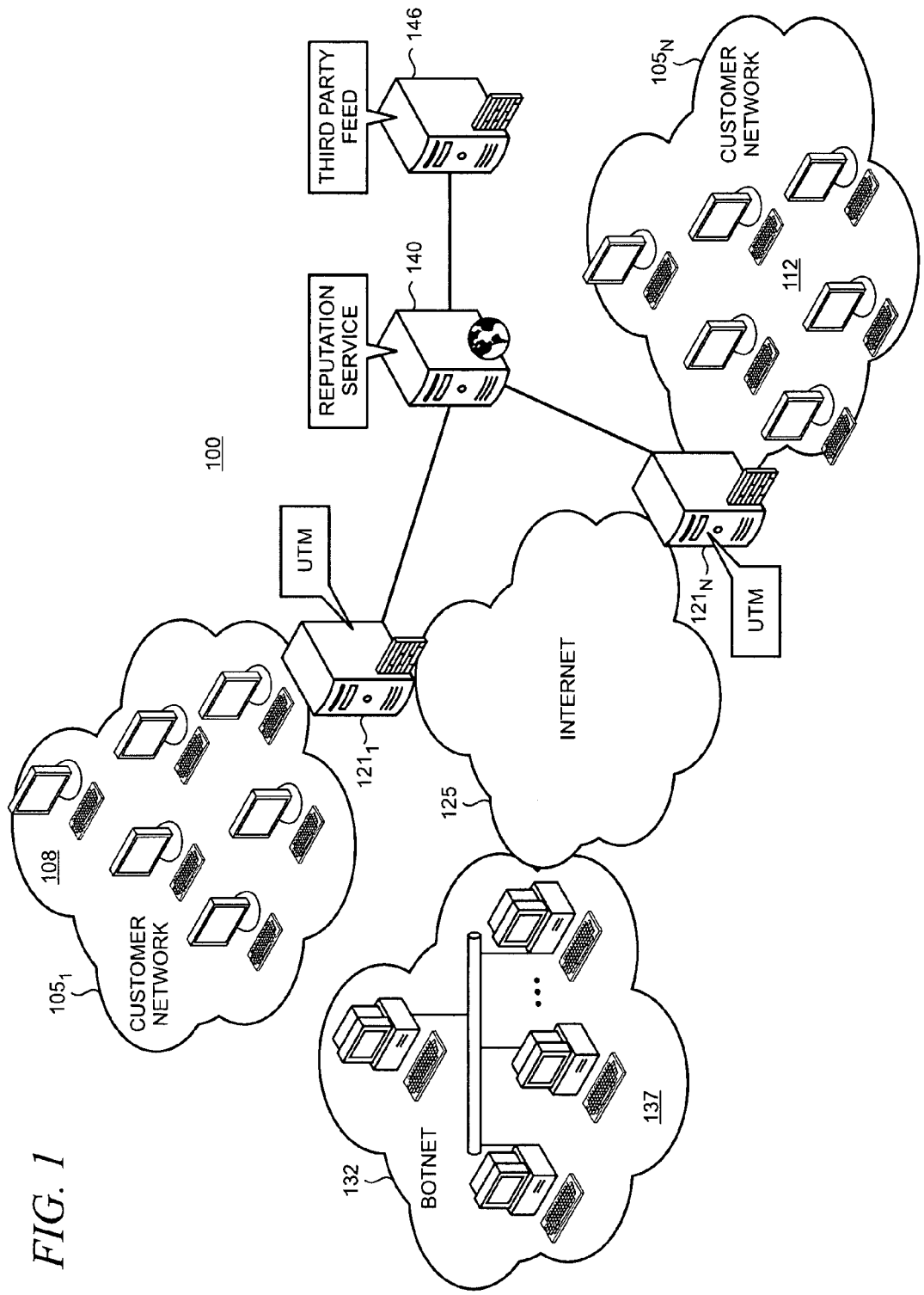
FIG. 1 shows an illustrative computer network environment in which the present arrangement for detection of adversaries through collection and correlation of assessments may be utilized.

FIG. 1 shows an illustrative computer network environment 100 in which the present arrangement for detection of adversaries through collection and correlation of assessments may be utilized. A number of enterprise or customer networks 105-1 . . . N are included in the environment 100. Customer network 105S includes a number of hosts 108 and customer network $105_N$ includes hosts 112. Networks 105 are protected by UTMs 121-1 . . . N that perform a variety of functions to protect the hosts inside the networks 105 from external threats and adversaries, particularly those that are accessed via the Internet 125. UTMs are security products that are commonly built on edge or network firewall products that incorporate many features in a single product including, for example, e-mail filtering, anti-virus ("AV") and anti-malware ("AM") protection, and intrusion detection, along with traditional proxy-based (i.e., application-layer) firewall functions.

An illustrative botnet 132 comprises a herd 137 of compromised hosts, such as home computers with broadband connectivity. Botnet 132 typically uses the Internet 125 in its attempts to attack hosts inside the customer networks 105. Botnet herd 137 can include any number of compromised hosts and could number in the several hundred thousands or even millions. Botnet 132 is typically spread over the globe and can thus be very difficult to deactivate.

Figure 2:
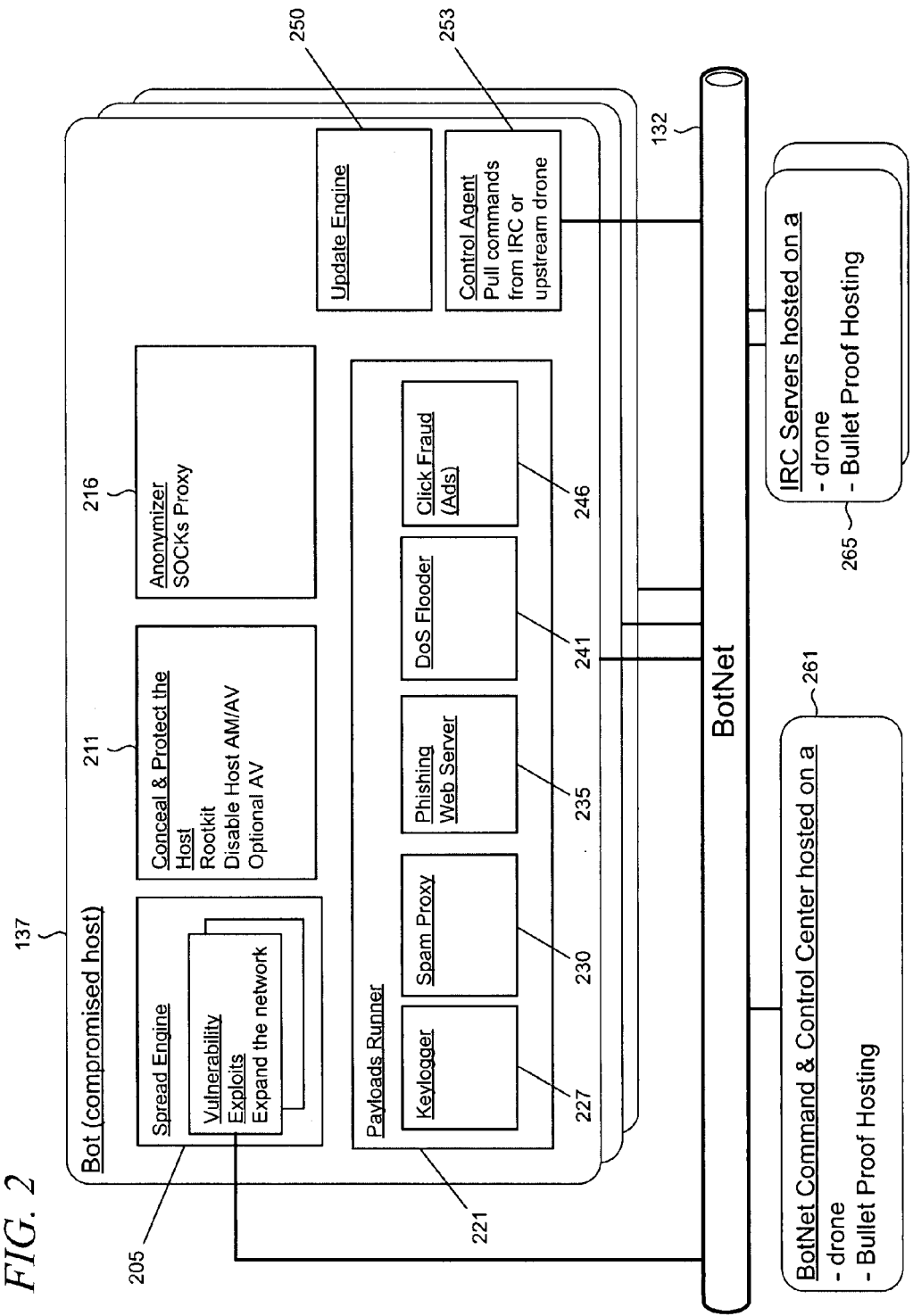
FIG. 2 shows functional components of an illustrative botnet.

Details of botnet 132 and herd 137 are shown in FIG. 2. Each comprised host is typically infected with malware which includes a number of functional modules, as shown. It is emphasized that the functional modules shown in FIG. 2 are illustrative, and a bot deployed in any given botnet might utilize only some of the modules, or additional functionality may be implemented in some cases. A spread engine 205 looks to expand the botnet further by attacking operating systems and applications on other hosts to exploit possible vulnerabilities. A concealment module 211 operates to conceal and protect the bot malware on the infected host by being configured as a rootkit that hides the bot's utilization of files, network connections, memory addresses, or registry entries to evade detection. Concealment module 211 may disable the host's anti-malware or anti-virus software. In addition, concealment module 211 may even install pirated anti-virus functionality in order to protect the host's takeover by another botnet. An anonymizer module 216 protects identifying information about the infected host from being revealed by using a SOCKS proxy server in order to transfer and retrieve data anonymously.

A payloads runner 221 includes a number of functional modules to carry out the malicious purposes of the botnet 132. These functional modules include a keylogger 227 that may be used for identity theft, a spam proxy 230 for sending spam, a back-end phishing web server 235 for hosting spoofed web sites, a DoS flooder 241 for supporting DoS for extortion or other attacks, and a click fraud module 246 that provides automated click throughs on web advertising in order to fraudulently gain per-click advertising revenue or reduce advertising costs by manipulating auctions.

An update engine 250 is arranged to keep the compromised host updated in order to dynamically reconfigure the host as may be required to conduct a variety of nefarious activities (it is believed that botnet herders lease botnets to various "customers" on a time-share basis). A control agent 253 pulls commands from an IRC (Internet Relay Chat) server 265 on a bullet-proof host or hosted by another drone in the botnet 132. A command and control center 261 provides a centralized command post that is either supported by a bullet-proof host or another drone in the botnet 132.

Returning back to FIG. 1, the UTMs 121 are arranged to detect adversaries, such as the bots in botnet 132, and collect their URLs and IP addresses. Such detection is typically performed reliably by observing or blocking attack attempts against the hosts in the customer networks 105. Such techniques for observing or blocking include, for example, observing spam sources, observing websites that host viruses, observing IP addresses that send distributed DoS attacks, and detecting command and control channel destinations to which the compromised hosts in the customer networks 105 connect.

In accordance with the principles of the present adversary detection arrangement, UTMs 121 are arranged to communicate with a reputation service 140. UTMs 121 report assessments of detected adversaries via telemetry that it uploads to the reputation service 140. As UTMs 121, or other security products having similar adversary detection functionalities, are commonly utilized by enterprises, businesses, and corporations, they can thus number in the hundreds of thousands to provide a very broad array of distributed adversary detection sensors. In addition, consumer products such as network routers and set top televisions terminals etc., may also be arranged to incorporate detection functionalities and thus be used to report assessments. It is emphasized that benefits of the present arrangement can be substantially realized even with a relatively small number of UTMs (e.g., a few dozen). In addition, assessments may be optionally collected from security products deployed in other networks, including home networks and other known resources, as collectively identified as third parties feeds 146 in FIG. 1.

Figure 3:
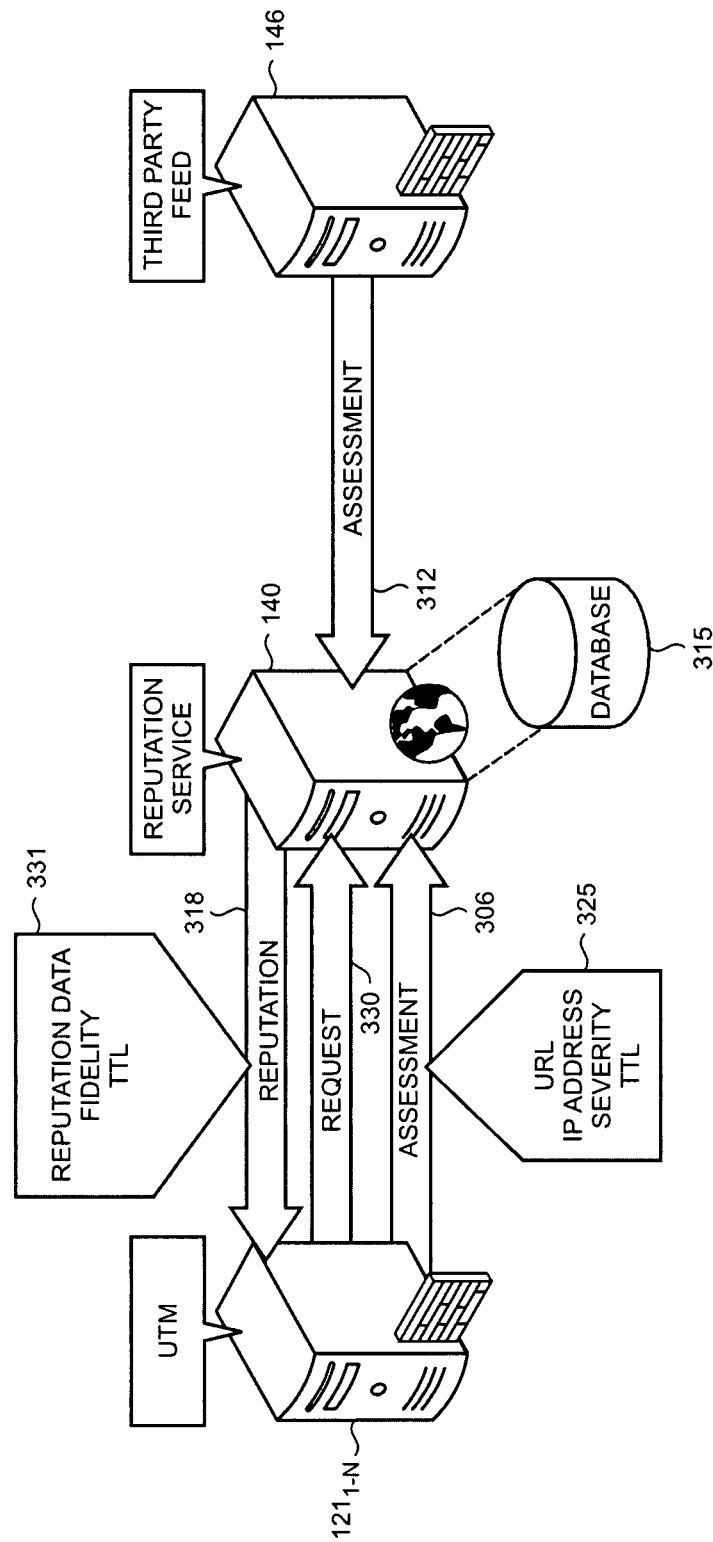
FIG. 3 shows the message flow between network security products and a reputation service.

As shown in FIG. 3, each of the plurality of UTMs $121_{1-N}$ reports the detected attacks as part of an assessment 306 that is reported to the reputation service 140. The reputation service 140 collects all the assessments from the multiple UTMs 121, and optionally from assessment 312 from the third party feed 146 in order to generate a reputation 318, as discussed in detail below, which is then downloaded by the UTMs 121. Assessments are typically stored in database 315 that is operatively coupled to the reputation service 140, as shown.

There is a possibility that a hacker might create false assessments in an attempt to damage the credibility of the reputation service 140, or launch a DoS attack, for example on a legitimate website and falsely accuse it of participating in malicious attacks. To prevent reporting of such false assessments, the reputation service 140 authenticates the UTMs 121 making the reports through use of a unique customer identification or security certificate to prove that the reporting UTM is legitimate and not a hacker. In addition, if false information is discovered by the reputation service, it can be traced back to a source UTM, and all further assessments sent from that UTM will be disregarded.

As indicated by reference numeral 325, an assessment, in this illustrative example, includes data fields which contain the URL or IP address of the detected adversary, a severity of the incident associated with the attack by the adversary, and a time-to-live ("TTL") value. The severity (e.g., low, medium, high, critical) describes the seriousness of an incident that is associated with the attack, which as noted above, can be both active and passive. For example, a host in customer network 105 (FIG. 1) might receive an e-mail containing a virus that is detected by the UTM or local anti-virus product and removed. The severity in the assessment 306 reported to the reputation service 140 could be "low," for example, given that the virus was detected and removed before it could cause any damage to the enterprise.

Each reported assessment has an assigned TTL value that defines the time interval over which the assessment is valid. Once the TTL expires, the assessment is no longer valid. The TTL is utilized in recognition that hackers can often quickly change the URL or IP addresses of the bots in their botnets. By using the TTL, the possibility is lessened for blocking a legitimate user who subsequently uses a URL or IP address after it has been abandoned by the hacker.

In this illustrative example, the default initial TTL value is four hours. However, if a UTM 121 detects the same adversary on a recurring basis, the TTL value in its subsequent reported assessments will be extended in time. Various types of algorithms may be used to extend the TTL value according to the needs of a specific application of the present adversary detection arrangement. For example, an exponentially increasing or geometrically increasing algorithm can be applied to double each TTL value with each recurring detection (e.g., 4, 8, 16 hours . . . ).

As noted above, the reputation service 140 uses the collected assessments from the UTMs 121 to generate the reputation 318. To do this, the reputation service 140 correlates the collected assessments to derive a fidelity (i.e., level of confidence) that will be associated with the reputation 318. In some implementations, such reputation fidelity can be reported back to the UTMs 121 with various levels, for example, low, medium, or high fidelity. Alternatively, fidelity can be arranged in a binary fashion (i.e., a reputation has sufficient fidelity to be relied upon, or has no fidelity). In either case, in accordance with the principles herein, a set or predetermined amount of fidelity must be present before a reputation may be used by a UTM to block traffic.

Various techniques or algorithms may be used to establish fidelity and the local rules governing assessment use may vary, but the general principle applied by all is that multiple, distinct UTMs (i.e., UTMs operating on different customer networks) must corroborate an adversary so that no single assessment is used to generate a reputation at the reputation service 140. For example, one technique would be to require a minimum number, such as 10, valid (i.e., having unexpired TTLs) assessments identifying the same adversary received from distinct UTMs, in order for the reputation service 140 to generate a reputation 318 having high fidelity. In this example, only high fidelity reputations are allowed to be used by a UTM 121 to block an adversary. In another example, a low fidelity reputation is generated when between one and five assessments identifying the same adversary are received from distinct UTMs. But in this example, a given UTM 121 might apply a different local rule to block the adversary associated with the low fidelity reputation, but only if the UTM also detects the adversary. Thus, corroboration from an outside source, even if it is low fidelity, is sufficient evidence when combined with the UTM's own observations to warrant taking a blocking action. It may also be desirable to use a fidelity algorithm that adjusts according to the severity of the reported incidents. For example, high or critical severity incidents that have the potential to cause greater harm might require fewer assessments from multiple, distinct sources to generate a high-fidelity reputation than when the severity is lower. Another illustrative technique is to increase the fidelity of a reputation when multiple different types of attacks are launched from the same adversary. For example, a hacker (or an entity leasing a botnet) might use a botnet for spam at one given time, and then for a DoS attack, followed by a identity theft attack. In this case, the reputation service 140 can assign greater fidelity to the reputation for the source initiating these multiple types of attack, even if such multiple attacks are directed to a smaller number of nodes (e.g., UTMs 121) which would result in a fewer number of reported assessments to the reputation service 140.

By requiring correlation of assessments from multiple distinct sources before issuing a reputation, the present arrangement prevents a hacker from simply installing a pirated UTM in order to influence a reputation. This provides a measure of security that may be used in addition to the use of authentication of assessment sources. Should a hacker attempt to provide assessments including fraudulent or misleading data, the fact that such assessments are not corroborated by other UTMs 121 can be used as a justification for revoking the certificate for the pirated UTM.

In some applications of the present arrangement, a UTM 121 sends a request 330 to the reputation service when it encounters an unknown URL or IP address to check the reputation of the URL or IP address before allowing access to the URL or accepting traffic from the IP address. In other applications, reputations are generated and sent to the UTMs 121 whenever a sufficient number of assessments are collected and correlated by the reputation service 140 irrespective of an explicit request.

As indicated by reference numeral 331 in FIG. 3, the reputation 318 that is downloaded by the UTM 121 includes, in this illustrative example, data fields containing reputation data, fidelity, and an optionally utilized TTL value. The reputation data can provide any of a variety of information that describes the reputation of the URL or IP address. This can be a simple binary indication (i.e., the URL or IP address has a good or bad reputation), or it can include more detailed reputation information, for example an IP address is known for transmitting spam, or phishing attacks, or a URL is known to include potentially threatening downloadable content, etc. In some cases, it may be desirable to include the URL or IP address of the adversary in the reputation as a part of a blacklist that is provided to a UTM. However, the particular reputation data that is provided to a UTM will typically be based on the requirements of a specific application of the present arrangement.

The fidelity field contains a fidelity indicator such as low, medium, high etc. The fidelity field can be optionally eliminated in some implementations. It is typically not used in cases where reputations are binary in nature and are thus only generated and sent when the derived fidelity reaches a predetermined threshold (and which would make reporting the actual fidelity value somewhat meaningless). The optionally-utilized TTL value in a reputation may similarly vary according to the requirements of a specific application. For example, a TTL value for the reputation 318 might be selected to be equal to the largest TTL value contained in a received assessment and a UTM 121 should block the URL or IP address only so long as the TTL remains valid. In other illustrative examples, no TTL is used and the reputation stays valid until it is explicitly revoked.

Figure 4:
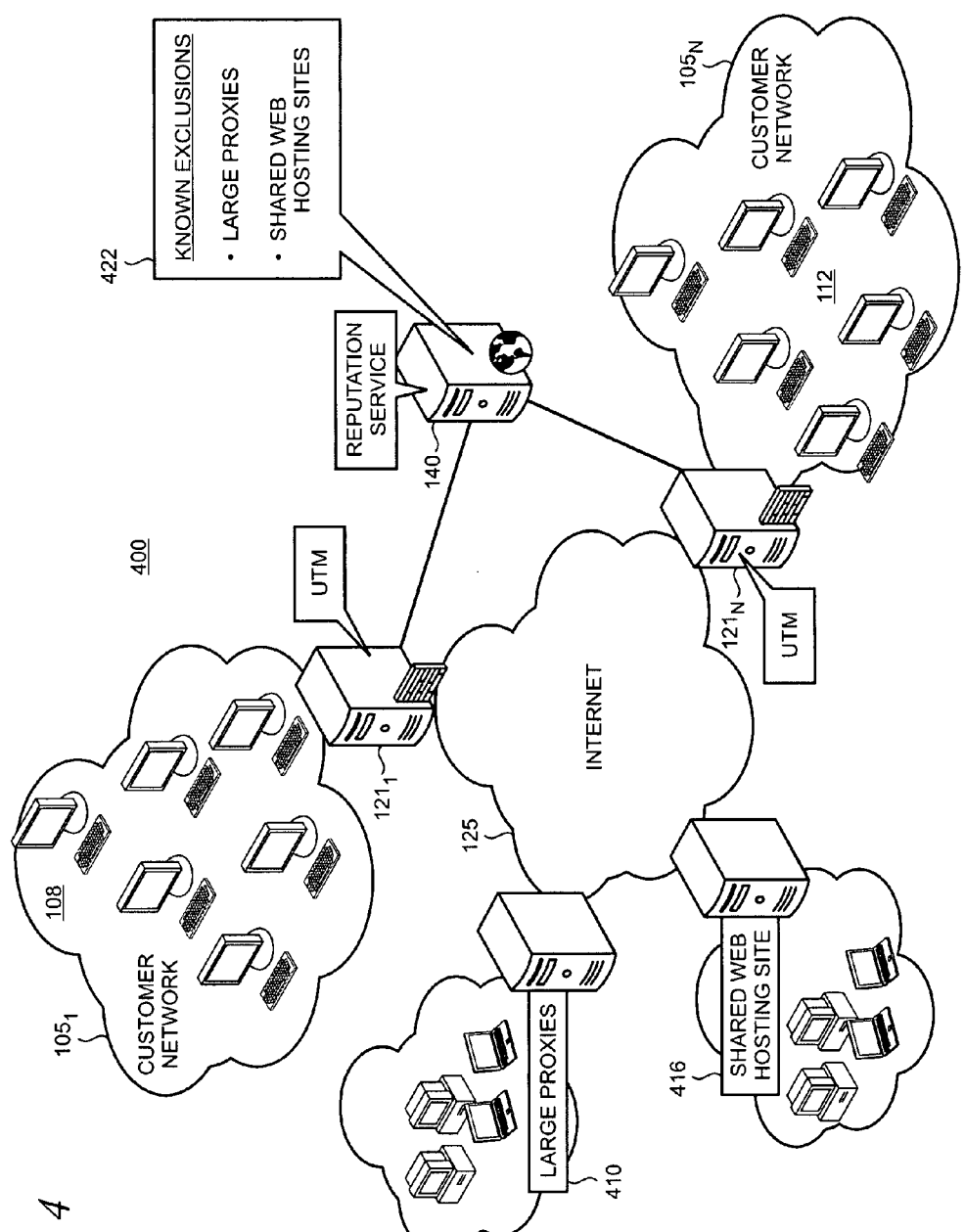
FIG. 4 shows an illustrative environment in which large proxies and shared web hosting are present.

FIG. 4 shows an illustrative environment 400 in which the presence of large proxies and NAT (network address translation) devices, identified by reference numeral 410, present a special case for the present arrangement for adversary detection, as do shared web hosting sites 416. In the first case, large proxies/NAT arrangements such as America Online ("AOL®") can have many thousand computers, some of which may be infected hosts that function as bots in a botnet. Thus, simply blocking the proxy will block not only adversaries, but legitimate users as well and create undesirable false positives. To address this special case, a list of known exclusions 422 is maintained by the reputation service 140. The exclusion list includes known large proxies which will be used by the reputation service 140 so that assessments identifying adversaries with IP addresses of the known large proxies will be ignored. In some implementations of the present arrangement, known large proxies can register with the reputation service 140 and be notified when attacks from hosts using their proxy are detected. The known large proxy can then be given a period of time to fix the problem before the proxy is blocked. In addition, an HTTP extension that is derived from an IP address can be used by the known large proxy as an ID for the compromised host to thereby allow a reputation to be selectively targeted to that host.

For the second special case of shared web hosting sites like MySpace® and MSN Hotmail™, the known exclusion list 422 includes a white list of URLs associated with shared web hosting sites that will not be blocked since those sites are shared by many users, including legitimate users. In some implementations, it may be possible to block certain sites by path, but not by domain of the shared web hosting site.

It is possible that some customers operating networks that engage in the present arrangement with a reputation service may have privacy concerns and not want to disclose information on incidents and attacks. Accordingly, as an optional feature, instead of reporting actual URLs and IP addresses in an assessment 306 (FIG. 3), information derived from the URL and/or IP address is reported. For example, the URLs and IP addresses can be subjected to a conventional hash algorithm such as CRC32, SHA-1 or MD-5 before being uploaded to the reputation service 140. Hashing the URLs and IP addresses will prevent observation, by the reputation service 140 or any middleman between the UTM and the reputation service 140, of the particular URLs or IP addresses that were responsible for attacking a particular customer network. In order to prevent recovery of the information input into the hash function through use of a rainbow table, conventional cryptographic measures may be utilized such as increasing a hash bit number, or using a dynamic salt value (i.e., random bits) which is added to the hash, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of operating a reputation service, the method comprising the steps of:
    collecting an assessment of a detected adversary from a security product deployed at a network, the assessment from the security product containing at least a time-to-live value that defines a time interval over which the assessment is valid, wherein once the time interval of the time-to-live value expires, the assessment is no longer valid; and
    correlating the collected assessment with other assessments to establish a confidence level that is associated with a reputation for the detected adversary,
        wherein the time-to-live value has an initial default value and the time-to-live value, in subsequent assessments from the security product, is increased, by the security product, using an algorithm, when the security product detects the adversary on a recurring basis.

2. The method of claim 1 including a further step of authenticating the assessment using one of ID or security certificate.

3. The method of claim 1 in which the security product is one of firewall product or UTM product.

4. The method of claim 1 including a further step of generating the reputation only when multiple valid assessments are received from distinct networks that identify the detected adversary.

5. The method of claim 1 in which the assessment provides a severity of a security incident associated with the detected adversary.

6. The method of claim 5 in which the severity is used to establish the confidence level.

7. The method of claim 1 in which the time-to-live value is increased using a function selected from one of exponential or geometric.

8. The method of claim 4 in which the confidence level increases as the number valid assessments received increases.

9. The method of claim 1 including a further step of maintaining a list of excluded proxies from which received assessments are ignored.

10. The method of claim 1 including a further step of maintaining a list of excluded shared web hosting sites for which received assessments are ignored.

11. The method of claim 1 in which the assessment identifies a URL or IP address associated with the adversary.

12. The method of claim 11 in which the URL or the IP address is subjected to a hashing algorithm.

13. The method of claim 12 in which the hashing algorithm is one of CRC32, MD-5 or SHA-1.

14. A computer-readable storage medium, not consisting of a propagated signal, containing instructions which, when executed by one or more processors disposed in an electronic device, performs a method for reporting assessments to a reputation service, the method comprising the steps of:
    generating an assessment at a security product upon detection of an adversary attacking an enterprise network;
    populating the assessment with data including a time-to-live value that defines a time interval over which the assessment is valid, and an ID value that uniquely identifies the adversary; and
    sending the assessment, including the data from said populating step, as telemetry to the reputation service,
        wherein the time-to-live value has an initial default value and the time-to-live value, in subsequent assessments from the security product, is increased, by the security product, using an algorithm, when the security product detects the adversary on a recurring basis.

15. The computer-readable storage medium of claim 14 in which the method includes a further step of populating the assessment with a severity of an incident associated with the adversary.

16. The computer-readable storage medium of claim 15 in which the ID value is one of URL or IP address.

17. A computer-implemented database, comprising:
    a computer;

records arranged for storing reputation assessments relating to an adversary detected by a plurality of sensors distributed among customer networks, each reputation assessment generated by a security product deployed at a network and, as received by the database, including at least a time-to-live value that defines a time interval over which each of the reputation assessments is valid; and an interface to a reputation service by which multiple valid records are correlated to derive a fidelity for a reputation associated with the adversary, wherein the time-to-live value has an initial default value and the time-to-live value, in subsequent assessments from the security product, is increased, by the security product, using an algorithm, when the security product detects the adversary on a recurring basis.

18. The computer-implemented database of claim 17 in which the adversary is a compromised host operating on a botnet.

19. The computer-implemented database of claim 17 in which the derived fidelity provides a level of confidence for the reputation.

* * * * *